Oct. 2, 1928.
F. W. MANNING
1,686,095
CONTINUOUS EXPELLING AND CLARIFYING PROCESS
Filed Nov. 20, 1924
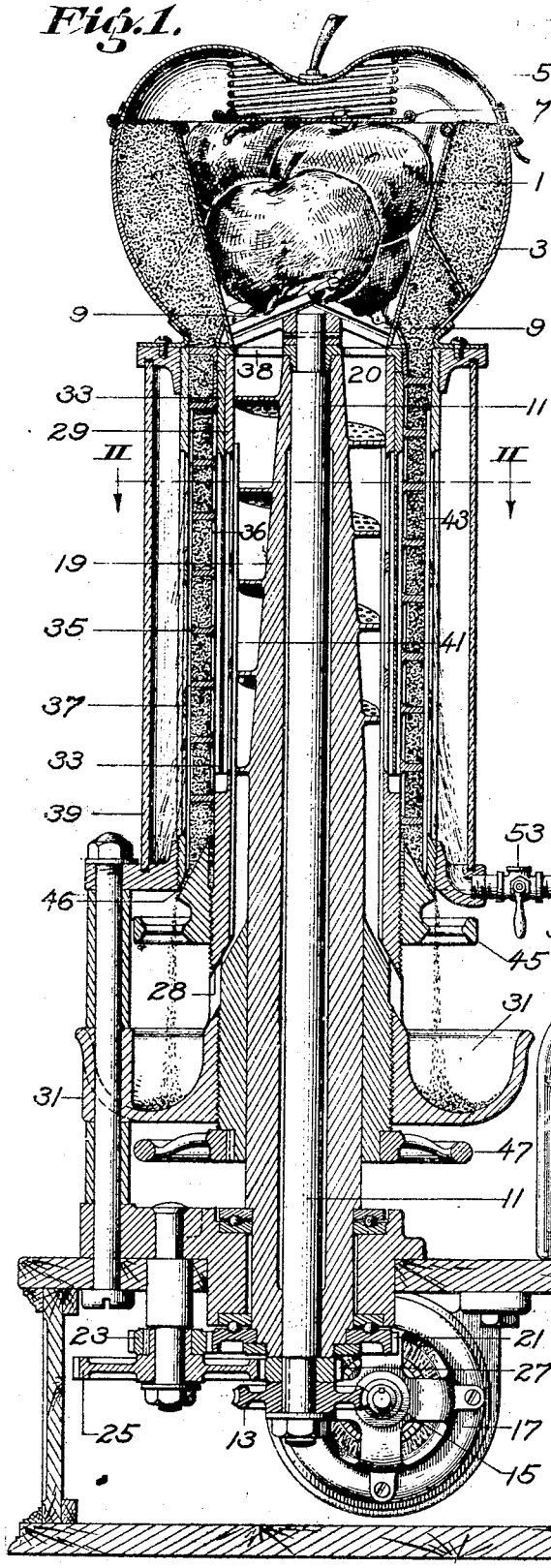
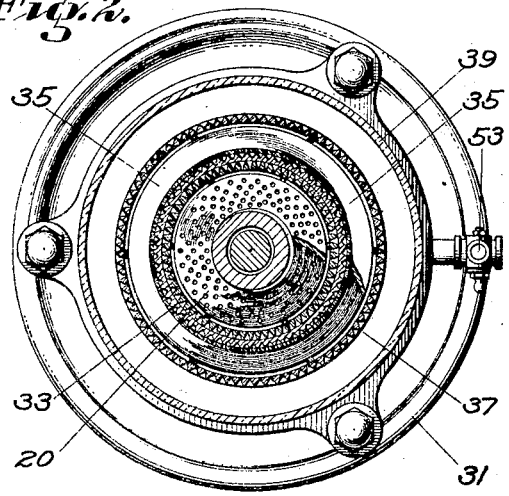
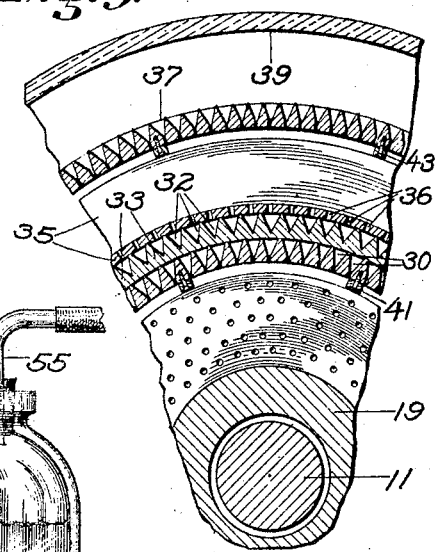
Inventor
FRED W. MANNING.
By Dewey, Strong, Townsend and Loftus
Attorneys Patented Oct. 2, 1928.

1,686,095

UNITED STATES PATENT OFFICE.

FRED W. MANNING, OF BERKELEY, CALIFORNIA.

CONTINUOUS EXPELLING AND CLARIFYING PROCESS.

Application filed November 20, 1924. Serial No. 751,058.

This invention relates to improved processes for the expressing of liquids from solids followed by the immediate clarifying or otherwise purifying of the expressed liquids, and to apparatus for carrying the same into practice. Such processes are applicable to the extraction of juices from fruits and vegetables, or oils from seeds, nuts, olives, etc., and for all other purposes wherein it is desirable to clarify or otherwise treat liquids expressed from solids.

Present practice is to expel juices, oils, etc., by means of such apparatus as continuous screw, cloth and rack, or hydraulic presses. The housewife utilizes the messy operation of squeezing the fruit in cloth bags in order to obtain juices for her jellies, etc. The clarification is carried out in a secondary operation usually by means of plate presses, but it is more often omitted because of the attendant difficulties such as low filtering rates, action of the fruit acids on the presses, cost of this secondary equipment, etc., and consequently we find murky looking apple and grape juice drinks offered to the public. Pure apple juice made from fresh, sound, ripe and selected apples is probably the most delicious, wholesome, beneficial and least expensive beverage we have and, as apples are an almost universal food, this drink should be found in every household and yet it is almost unobtainable. The cider that is sold not only lacks clarification but is very often made from unwashed and partially decayed apples and contains putrifactive bacteria, and the highly advertised imitation fruit beverages are often nothing but concoctions of coal tar dye, synthetic chemical flavor, citric acid, sugar and water. Twenty million bushels is the avereage annual waste in the Nation's apple crop, which, if with other surplus fruits were utilized for beverages, would increase the value of the Nation's fruit beverage industry approximately $100,000,000. The only way to prevent this great loss is to make it possible for every farmer, and every fruit grower, to work up his own crop by converting his undergrades and other surplus fruit into juice products. Also if every city home could make up its own beverages, jellies, etc., the demand for fruits for this purpose would be so greatly stimulated that there would never again be a recurrence of the over production of 1923 when thousands of tons of grapes were left hanging on the vines because there was no market for them, and no longer would the value of the imitation fruit beverage industry remain approximately twenty times the value of the real fruit beverage industry. Furthermore, the extraction of juices from fruit solids and their clarification as now accomplished in the presence of air, permit the destruction of Vitamin "C" and especially will the destruction be rapid if the expelling and clarification is carried out at high temperatures. To avoid this injury to the antiscorbutic value of the fruit juices the expressing and treatment of the juices should be accomplished in the absence of oxygen and the juices should be kept out of all contact with air from the time the fruit solids are crushed or shredded until the juices are drawn off for use.

It is, therefore, an object of my invention to make it possible for every farmer, fruit grower and housewife to obtain at low cost an apparatus which, with very little effort, will furnish them with perfectly pure and brilliantly clear fruit and vegetable juices, free from insoluble solids, colloidal suspensions, etc., for beverages, jellies, syrups, vinegar, soups, etc.

It is a further object of my invention to provide a method and apparatus for the continuous expelling of liquids from solids and the simultaneous treating of the expelled liquids.

In accordance with my invention, I introduce the fruit, vegetables or other solids into a disintegrating hopper where it is crushed, sliced, grated or shredded as desired. From the hopper the separated portions of the solids with contained or expressed liquid, are passed into a compression chamber by means of a suitable feeding valve or by gravity, where the liquid is almost completely expelled from the pulp solids and is then forced through a wall of either stationary or moving treating solids into a filtrate receiver, the pulp solids being passed on through and out of the apparatus by means of a compression screw, ram or other suitable means. The forcing of the expressed liquid through the wall of treating solids is accomplished by a differential in liquid pressure between the pulp and filtrate sides of the wall which may be due to either a sub-atmospheric pressure on the filtrate side, or a super-atmospheric pressure on the pulp side, or both. The treating solids may be kieselguhr, cotton fibre, asbestos, paper pulp, silica, etc. for clarification purposes, or bone black, etc. for decolorizing purposes, or a suitable agent for precipitating cream of tartar or other undesirable materials, and for other purposes, or it may be a combination of agents for different purposes, and the agent or agents may be passed intermittently or continuously between two retaining walls, as described in my copending application, Serial Number 747,431, filed Nov. 3, 1924, or introduced directly into the disintegrating hopper and passed on through with the pulp solids, or both. If the agent is introduced directly into the hopper the outer retaining wall, feeding screw for the treating solids, and the grooved imperforate drainage sleeve described later, will usually not be required. The apparatus may be made of some suitable metal to withstand the action of the juice acids, such as bronze free from zinc and tinned or silvered, and may be surrounded with steam or refrigerating coils to coagulate the protein, precipitate certain solids, etc., so that these may be eliminated during the filtering period, or the fruit or other solids may be heated before being introduced into the disintegrating hopper.

The features of the invention hereinbefore referred to in general terms will be better understood by reference to the following description, taken in conjunction with the accompanying drawings which illustrate a preferred form of apparatus for carrying out my invention. It will be understood, however, that the construction herein illustrated and described is merely illustrative of how the features of the invention may be employed and that the drawings are not to be construed as defining or limiting the scope of the invention, the claims appended to this specification being relied upon for that purpose.

Referring to the figures of the drawing,
Fig. 1 is a sectional elevation of the apparatus.

Fig. 2 is a horizontal sectional view taken on line II—II of Fig. 1.

Fig. 3 is a fragmentary enlarged view of Fig. 2.

Fig. 4 is a fragmentary enlarged elevation in vertical section through the compression screw.

The apparatus as shown consists of a hopper 1 for the pulp solids inside of a hopper 3 for the treating solids, both of which are closed by a hinged door 5 to which is attached a spring pressed plate 7 to force the pulp solids against the graters or crushers 9, which are driven through a shaft 11, worm gear 13, and worm 15 by a motor 17. A compression screw 19, the flights of which are perforated and covered with a coarse filtering fabric protected by a perforated wearing plate, is also driven by the motor 17 through gears 21, 23, 25 and 27 and shaft 11, the motor and all the gears being enclosed in a cabinet 18, which also forms a stand for the apparatus. Surrounding the compression screw is the inner filter wall 29, the lower end of which forms the trough 31. Over this wall and fixed permanently to it is a grooved imperforate drainage sleeve 33, around which rotates a perforated feeding screw cylinder 35 operating inside of an outer filter wall 37, surrounding which is a glass cylinder 39. The filter walls, as shown, are made from slotted pipes but they may be otherwise constructed as from suitably spaced, parallel bars, cylinders lined with filter fabric, etc.

Distance bars 41 and 43 are attached to the filter walls to prevent of the turning of the solids with the screws and disturbance of the solids next the filtering slots. The width of the filter slots in the inner and outer filter walls will usually vary between 5/1000″ and 10/1000″ but the width of the slots 36 in the feeding screw cylinder should be greater so that any solid matter passing through the inner filtering wall will readily pass into and be retained by the treating solids. Adjusting nuts 45 and 47 regulate the compactness of the treating and pulp solids respectively by regulating the size of the discharge openings 46 and 28. The glass filtrate receiver jar 49 is connected to the glass cylinder 39 by means of a connection 51 and threeway cock 53, and connected to a water jet vacuum pump, not shown, by means of a connection 55.

The operation of the apparatus thus constructed has been in part indicated in connection with the foregoing description. The fruit, or other solids, after being crushed or shredded in hopper 1, pass into the compression chamber 20 where the pressure exerted readily separates the juice from the pulp. The vacuum maintained in the filtrate receiver jar prevents air from coming into contact with the liquid as it is being expelled and clarified, or otherwise treated and causes the liquid to pass through the slots and down the outside grooves 30 of the inner filter wall and up the grooves 32 of the drainage sleeve 33, through the slots 36 of the feeding screw cylinder into and through the treating solids where it is clarified, decolorized or otherwise purified, and finally on passing through the slots of the outer filter wall 37 the liquid runs down into the filtrate receiver 49 brilliantly clear. As will be apparent, the disintegrating of the solids, the expressing of the liquid therefrom and the purifying thereof are all carried on simultaneously and in a substantially continuous manner.

The purpose of the grooved imperforate drainage sleeve 33 is to prevent air from being drawn through from the top of the compression chamber when an open hopper is used and solids are being handled that do not require total exclusion of air from the compression chamber. The feeding screw cylinder 35 is attached to and rotates with the compression screw 19, by means of a spider nut 38 although, if desirable, means may be supplied to rotate the screws independently of each other. The pitch of the flights of both screws is determined by the purpose for which the apparatus is used, the pulp solids being forced down and discharged through the opening at 28 in the lower end of the filter wall 29 into the hopper 31 as quickly as the filtrate can be forced through the treating solids, and the treating solids moved along and discharged through the opening at 46 into the same hopper through the openings in the wheel of the adjusting nut 45, before any clogging takes place. The flights of both screws are kept from direct contact with their respective filtering walls by means of distance bars 41 and 43 so that the solids may be constrained to move forwardly axially without disturbance to the solids next the filtering slots. However, in many cases these distance bars will not be necessary.

The advancing or underside of the flights of the compression screw being perforated and covered with a filter fabric protected by a thin perforated wearing plate, serves the purpose of constantly clarifying the rising liquid with the downward movement of the solids before the liquid comes in contact with the filter wall and thereby increases the filtering rate.

The apparatus just described is suitable for the home, soda fountain, or cafeteria for furnishing in a few minutes for immediate use several glasses of sparkling clear fruit juice, or in the larger sizes, it may be used for the extracting and clarifying or otherwise treating of large quantities of juice for syrups, vinegar, pasteurizing purposes, etc.

Large size apparatus may be operated at higher pressure by maintaining liquid pressure inside the compression chamber, but for fruit juices and other liquids whose value may be injured by oxidization, it will also be advisable to draw off the filtrate into suitable receiver tanks by means of vacuum pumps, which arrangement will also serve to remove the small amount of air released from the fruit solids itself during disintegration. The continuous feeding of solids into the apparatus and the maintaining of liquid pressure in the compression chamber may be accomplished by crushing or shredding the solids into a suitable hopper situated immediately above a feeding valve that not only regulates the rate at which the pulp and liquid is discharged into the compression chamber but supplies and maintains the desired pressure for filtering purposes. Such a valve is described in my copending application Serial No. 20,155, filed April 2, 1925. The treating solids may also be fed separately through the same feeding valve.

Having thus described my invention, what I claim and desire to secure by Letters Patent is:

1. The process of treating fruit and vegetable juices by passing the said juices through a body of treating solids, said solids being continuously moved over a filter wall.

2. The process of removing juices from fruits and vegetables and treating said juices by passing said juices through a filter material, said material being uniformly renewed.

3. A process of removing juices from fruits and treating said juices by continuously passing the juices through a filter material, and continuously and uniformly renewing said material.

FRED W. MANNING.